US008799871B2

(12) United States Patent
Baker (10) Patent No.: US 8,799,871 B2
(45) Date of Patent: Aug. 5, 2014

(54) COMPUTATION OF ELEMENTWISE EXPRESSION IN PARALLEL

(75) Inventor: Brett Baker, Framingham, MA (US)

(73) Assignee: The MathWorks, Inc., Natick, MA (US)

( * ) Notice: Subject to any disclaimer, the term of this patent is extended or adjusted under 35 U.S.C. 154(b) by 1907 days.

(21) Appl. No.: 11/651,119

(22) Filed: Jan. 8, 2007

(65) Prior Publication Data
US 2008/0178165 A1 Jul. 24, 2008

(51) Int. Cl.
*G06F 9/44* (2006.01)
*G06F 9/45* (2006.01)

(52) U.S. Cl.
CPC .................................... *G06F 8/45* (2013.01)
USPC .......................... 717/130; 717/124; 717/158

(58) Field of Classification Search
CPC ............ G06F 11/3466; G06F 11/3644; G06F 11/3612; G06F 11/3636; G06F 2201/865; G06F 11/3488; G06F 11/362; G06F 11/3664
See application file for complete search history.

(56) References Cited

U.S. PATENT DOCUMENTS

| | | | | |
|---|---|---|---|---|
| 5,175,856 A * | 12/1992 | Van Dyke et al. | ............ | 717/151 |
| 5,274,818 A | 12/1993 | Vasilevsky et al. | | |
| 5,950,003 A | 9/1999 | Kaneshiro et al. | | |
| 6,311,324 B1 * | 10/2001 | Smith et al. | .................... | 717/130 |
| 6,374,369 B1 | 4/2002 | O'Donnell | | |
| 7,032,217 B2 * | 4/2006 | Wu | .............................. | 717/158 |
| 7,251,810 B1 * | 7/2007 | Nolte | ............................ | 717/130 |
| 7,496,908 B2 * | 2/2009 | DeWitt et al. | ................. | 717/158 |
| 7,765,094 B2 * | 7/2010 | Bodden et al. | ................ | 717/130 |
| 7,774,758 B2 * | 8/2010 | Nardini et al. | ................ | 717/130 |
| 7,877,734 B2 * | 1/2011 | Branda et al. | ................. | 717/130 |
| 7,908,591 B1 | 3/2011 | Nell et al. | | |
| 7,941,787 B2 * | 5/2011 | Watanabe | ...................... | 717/124 |
| 8,156,481 B1 * | 4/2012 | Koh et al. | ..................... | 717/158 |
| 8,214,817 B2 * | 7/2012 | Mendelson et al. | ......... | 717/158 |
| 8,261,245 B2 * | 9/2012 | Branda et al. | ................. | 717/130 |
| 8,286,143 B2 * | 10/2012 | Garimella et al. | ........... | 717/124 |
| 8,490,061 B2 * | 7/2013 | Chung et al. | .................. | 717/130 |
| 8,549,488 B2 * | 10/2013 | Dick et al. | ..................... | 717/130 |
| 8,627,302 B2 * | 1/2014 | Chen et al. | .................... | 717/158 |
| 8,635,606 B2 * | 1/2014 | Kruglick | ....................... | 717/153 |
| 2002/0059562 A1 * | 5/2002 | Haga | ............................. | 717/130 |
| 2002/0147966 A1 * | 10/2002 | Frazier | .......................... | 717/127 |

(Continued)

FOREIGN PATENT DOCUMENTS

CA            2262277        5/2003

OTHER PUBLICATIONS

Rong-Guey Chang et al.; Support and optimization for parallel sparse programs with array intrinsics of Fortran 90; Published by Elsevier B.V.; 2004; retrieved online on Jan. 23, 2014; pp. 527-550; Retrieved from the Internet: <URL: http://www.iis.sinica.edu.tw/~trc/public/publications/pc04/pc04ChangChuangLee.pdf>.*

(Continued)

*Primary Examiner* — Thuy Dao
*Assistant Examiner* — Hanh T Bui
(74) *Attorney, Agent, or Firm* — Nelson Mullins Riley & Scarborough LLP (57) ABSTRACT

An exemplary embodiment provides methods, systems and mediums for executing arithmetic expressions that represent elementwise operations. An exemplary embodiment provides a computing environment in which elementwise expressions may be executed in parallel by multiple execution units. In an exemplary embodiment, multiple execution units may reside on a network.

21 Claims, 7 Drawing Sheets

(56) References Cited

U.S. PATENT DOCUMENTS

| | | | | |
|---|---|---|---|---|
| 2004/0194077 | A1 | 9/2004 | Bharadwaj et al. | |
| 2004/0221270 | A1 | 11/2004 | Witchel et al. | |
| 2005/0125784 | A1* | 6/2005 | Yang et al. | 717/158 |
| 2006/0059473 | A1* | 3/2006 | Moler | 717/149 |
| 2006/0098017 | A1* | 5/2006 | Tarditi et al. | 345/505 |
| 2006/0101421 | A1* | 5/2006 | Bodden et al. | 717/130 |
| 2006/0130001 | A1* | 6/2006 | Beuch et al. | 717/130 |
| 2007/0124363 | A1* | 5/2007 | Lurie et al. | 709/202 |
| 2007/0124727 | A1* | 5/2007 | Tennyson et al. | 717/158 |
| 2007/0169003 | A1* | 7/2007 | Branda et al. | 717/130 |
| 2007/0220495 | A1* | 9/2007 | Chen et al. | 717/130 |
| 2007/0234309 | A1 | 10/2007 | Davia et al. | |
| 2007/0277155 | A1* | 11/2007 | Casey | 717/124 |
| 2008/0148242 | A1* | 6/2008 | Cobb et al. | 717/130 |
| 2008/0222608 | A1* | 9/2008 | Gartner et al. | 717/124 |
| 2008/0222614 | A1* | 9/2008 | Chilimbi et al. | 717/130 |
| 2008/0276227 | A1* | 11/2008 | Greifeneder | 717/130 |
| 2009/0125891 | A1* | 5/2009 | Garimella et al. | 717/131 |
| 2009/0254889 | A1* | 10/2009 | Prasadarao | 717/130 |
| 2010/0064279 | A1* | 3/2010 | Stewart | 717/124 |
| 2011/0113407 | A1* | 5/2011 | Mariani et al. | 717/130 |
| 2011/0314453 | A1* | 12/2011 | Tebeka et al. | 717/130 |
| 2012/0317553 | A1* | 12/2012 | Schmidt | 717/130 |
| 2013/0219370 | A1* | 8/2013 | Beale et al. | 717/128 |

OTHER PUBLICATIONS

Phitchaya Mangpo Phothilimthana et al.; Portable Performance on Hetergeneous Architectures; ACM; 2013; retrieved online on Jan. 23, 2014; pp. 431-443; Retrieved from the Internet: <URL: http://delivery.acm.org/10.1145/2460000/2451162/p431-phothilimthana.pdf?>.*

Diana Villa et al.; A Framework for Profiling Multiprocessor Memory Performance; IEEE; 2004; retrieved online on Jan. 23, 2014; pp. 1-9; Retrieved from the Internet: <URL: http://ieeexplore.ieee.org/stamp/stamp.jsp?tp=&arnumber=1316135>.*

Clemens Grelck and Sven-Bodo Scholz; SAC—A Funtional Array Language for Efficient Multi-threaded Execution; 2006; retrieved online on May 1, 2014; pp. 383-427; Retrieved from the Internet <URL: http://www.sac-home.org/publications/GrelScholJPP06.pdf>.*

Markus Weinhardt et al.; Using Function Folding to Improve Sillicon Efficiency of Reconfigurable Arothmetic Arrays; 2004; IEEE; retrieved online on May 1, 2014; pp. 239-246. Retrieved from the Internet <URL: http://ieeexplore.ieee.org/stamp/stamp.jsp?tp=&arnumber=1393274>.*

Tobias Lauer et al.; Exploring Graphics Processing Units as Parallel Coprocssors for Online Aggregation; 2010; ACM; retrieved online on May 1, 2014; pp. 77-84; Retrieved from the Internet <URL: http://delivery.acm.org/10.1145/1880000/1871958/p77-lauer.pdf?>.*

International Search Report for Application No. PCT/US2008/000274, dated Jul. 9, 2008.

European Office Action for Application No. 08713057.1, dated Oct. 21, 2009.

Gaurav, S. K.C. et al., "Countering Code-Injection Attacks With Instruction-Set Randomization," CCS '03, Proceedings of the 10th ACM Conference on Computer and Communication Security, pp. 272-280 (2003).

Lin, Jin et al., "A Compiler Framework for Recovery Code Generation in General Speculative Optimizations," Proceedings of the 13th International Conference on Parallel Architecture and Compilation Techniques PACT'04), 12 pages (2004).

Shende, Sameer et al., "Protable Profiling and Tracing for Parallel, Scientific Applications using C++," Proceedings of SPDT'98: ACM Sigmetrics Symposium on Parallel and Distributed Tools, pp. 134-145 (1998).

* cited by examiner

MATLAB

> Z = sqrt(X) + (Y) — 720

*Fig. 7*

MATLAB

820 — ☐ Generate profiles of expression
830 — ☐ Use pre-determined profiles
840 — ☐ Apply weights to expression

*Fig. 8*

MATLAB

Weights plus    500
sqrt    2

*Fig. 9*

COMPUTATION OF ELEMENTWISE EXPRESSION IN PARALLEL

COPYRIGHT

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

A technical computing environment provides mathematical and graphical tools for mathematical computation, data analysis, visualization and algorithm development. For example, a technical computing environment can be used to solve complex engineering and scientific problems by developing mathematical models that simulate the problem. A technical computing environment may allow scientists and engineers to interactively perform technical computing using elementwise operations. The elementwise operations may also be called array operations. For example, the addition and subtraction of arrays may be performed on an elementwise basis.

SUMMARY

Exemplary embodiments provide methods, systems and mediums for performing arithmetic computations that include elementwise operations. Elementwise operations can be performed in parallel by multiple execution units. Multiple execution units may be used to increase the computing power and to decrease computational time.

In an exemplary embodiment, parallel computing may encompass computing performed simultaneously or nearly simultaneously, as well as computing performed on different execution units, regardless of the timing of the computation. An execution unit may be any unit capable of carrying out processing. Execution units may be, but are not limited to: separate processors, cores on a single processor, hardware execution units, software execution units, software threads, portable devices, biological execution units, quantum execution units, etc.

An exemplary embodiment may perform elementwise operations by grouping operations of an expression into chunks, and executing the chunks in parallel on multiple execution units. The decision whether to execute a given expression in parallel may be made by attaching a weighting factor to each operator and/or function in the expression, and using the weighting factor to decide whether there will be a performance advantage to running the expression in parallel. This determination may take into account the weighting factors on operators and/or functions in the expression, as well as the number of elements in the data.

In an exemplary embodiment, a method is provided for accelerating execution of an arithmetic expression in a computing environment. An expression is obtained including at least an array to which an elementwise operator or function is applied. The elementwise operator or the elementwise function is weighted to determine whether the expression is to be executed in parallel. Code is generated to compute the expression in parallel. The arithmetic expression is computed with a subset of the elements of the array in parallel with one or more additional subsets of the elements of the array.

In an exemplary embodiment, a medium holding instructions executable in a computing device is provided for accelerating execution of an arithmetic expression in a computing environment. An expression is obtained including at least an array to which an elementwise operator or function is applied. The elementwise operator or the elementwise function is weighted to determine whether the expression is to be executed in parallel. Code is generated to compute the expression in parallel. The arithmetic expression is computed with a subset of the elements of the array in parallel with one or more additional subsets of the elements of the array.

In an exemplary embodiment, a system is provided for accelerating execution of an arithmetic expression in a computing environment. The system includes an accelerator for obtaining an expression including at least an array to which an elementwise operator or function is applied. The system also includes an analyzer for weighting the elementwise operator or the elementwise function to determine whether the expression is to be executed in parallel. The system also includes a code generator for generating code to compute the expression. The arithmetic expression is computed with a subset of the elements of the array in parallel with one or more additional subsets of the elements of the array.

BRIEF DESCRIPTION OF THE DRAWINGS

The foregoing and other objects, aspects, features, and advantages of the invention will become more apparent and may be better understood by referring to the following description taken in conjunction with the accompanying drawings, in which.

DETAILED DESCRIPTION

Exemplary embodiments may provide an accelerated execution of arithmetic expressions in a computing environment. The arithmetic expressions may include one or more elementwise operators and/or functions applied to one or more operands. The operators and/or functions may be applied to one or more arrays. An exemplary embodiment may execute arithmetic expressions in parallel. For example, an exemplary embodiment may execute an expression containing elementwise operations in parallel. In one embodiment, elementwise operations may be performed by grouping elementwise operations into chunks, and executing the chunks in parallel on multiple execution units. In an exemplary embodiment, the chunks may be executed by multiple threads of execution. As used herein, thread refers to a sequence of instructions. In one or more exemplary embodiments, a thread may execute in parallel with one or more other threads. Multi-thread implementations may employ threads that exchange information with each other, such as instructions, and/or threads that operate independently of each other (e.g., by not exchanging information therebetween). Multiple threads can be executed in parallel using one or more execution units.

An exemplary embodiment may determine whether an expression should be executed in parallel. In one implementation, this determination may be made by attaching a weighting factor to one or more operators or functions in the expression. For example, in one implementation, each operator or function may be weighted. Exemplary embodiments may employ a number of techniques for assigning weights to an expression. For example, pre-computed weights of operators and/or functions in the expression may be used. An exemplary embodiment may dynamically determine and use the weights of operators and functions in the expression. Exemplary embodiments may manually (e.g., via a user input) or automatically determine weights that are applied to expressions and/or functions. Exemplary embodiments, may monitor aspects of an expression or function, such as the number of elements in an array. For example, an embodiment may take the number of elements in an array into account before performing an operation.

Elementwise operations, as used herein, may be referred to as array operations. For example, the addition, subtraction, multiplication and/or division of an array by a scalar may be performed on an elementwise basis. For example, addition by a scalar may be represented as:

$$[a1 a2]+b=[a1+b\ a2+b]$$

in an exemplary embodiment.

An array may have 2 or more dimensions. When performing array operations on two arrays, each of which has more than 1 element, both the actual dimensions and the number of dimensions of the two arrays must be the same. In an exemplary embodiment, the addition, subtraction, multiplication and/or division of arrays may be performed on an elementwise basis. For example, $$[a1 a2]-[b1 b2]=[a1-b1\ a2-b2]$$

may represent elementwise subtraction. Elementwise multiplication of two arrays (represented by the .* operator) can be illustrated as follows:

$$[a1 a2].*[b1 b2]=[a1*b1\ a2*b2]$$

Exemplary embodiments may further be used to apply arithmetic functions to an array on an elementwise basis. For example, $$\cos [a1\ a2]=[\cos(a1)\cos(a2)]$$

Elementwise operations, as described above and elsewhere herein, are exemplary and other embodiments may use or may define different elementwise operators, such as elementwise left division, elementwise power, etc.

Elementwise expressions may include indexing operations that cause the operations to be performed on a subset of the array. For example, if a and b are 2×2 matrices, then using an indexing syntax, such as a MATLAB-compatible indexing syntax:

$$a=[a_{11} a_{12}; a_{21} a_{22}]$$

$$b=[b_{11} b_{12}; b_{21} b_{22}]$$

$$a([12],1)+b([12],2)=[a_{11}+b_{12}; a_{21}+b_{22}]$$

When elementwise operations are performed on the subsets selected by indexing, the subsets themselves may be broken into chunks that are executed in parallel.

Figure 1:
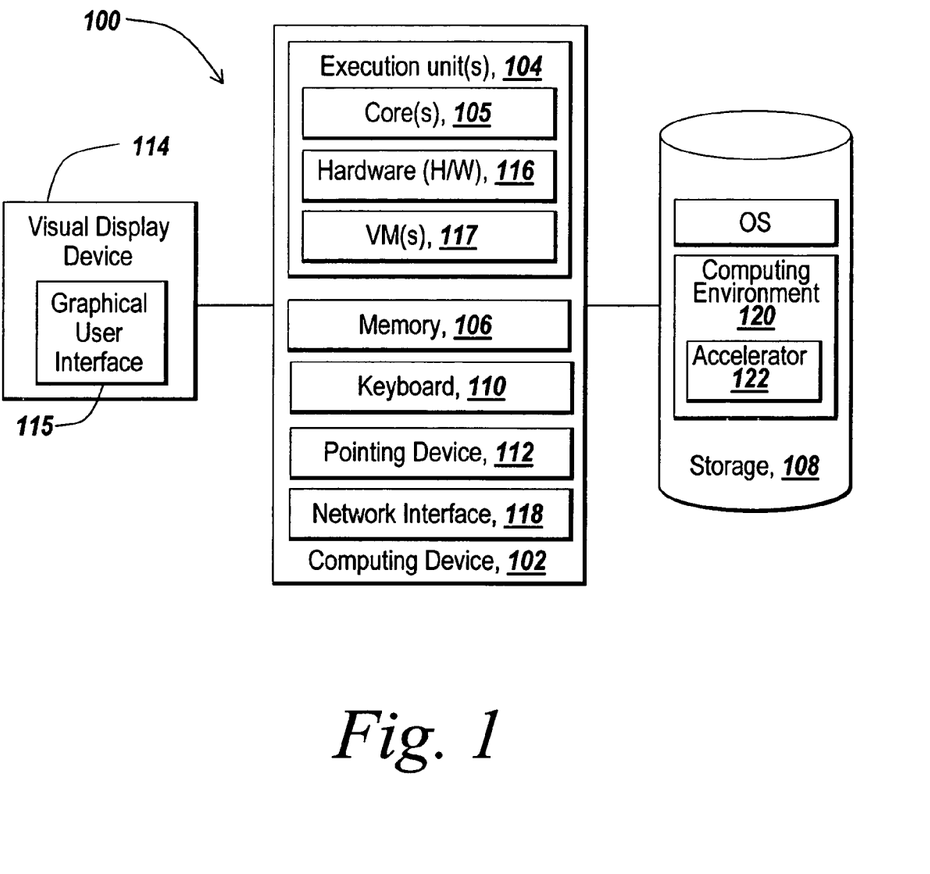
FIG. 1 is a block diagram of a computing device for practicing an exemplary embodiment.

FIG. 1 depicts an environment 100 suitable for practicing an exemplary embodiment. Computing device 102 may include execution units 104, memory 106, keyboard 110, pointing device 112 and network interface 118. Execution units 104 may include hardware or software based logic to execute instructions on behalf of computing device 102. For example, in one implementation execution units 104 may include one or more processors, such as a microprocessor. In one implementation, the execution unit 104 may include single or multiple cores 105 for executing software stored in the memory 106, or other programs for controlling the computing device 102. In another implementation, execution units 104 may include hardware 116, such as a digital signal processor (DSP), a graphics processing unit (GPU), a field programmable gate array (FPGA), an application specific integrated circuit (ASIC), etc., on which at least a part of applications can be executed. In another implementation, execution units 104 may include virtual machine (VM) 117 for executing the code loaded in the memory 106. Multiple VMs 117 may be resident on a single execution unit 104.

The memory 106 may include a computer system memory or random access memory (RAM), such as dynamic RAM (DRAM), static RAM (SRAM), extended data out RAM (EDO RAM), etc. The memory 106 may include other types of memory as well, or combinations thereof. A user may interact with the computing device 102 through a visual display device 114, such as a computer monitor, which may include a graphical user interface (GUI) 115. The computing device 102 may include other I/O devices, such a keyboard 110 and a pointing device 112 (for example, a mouse) for receiving input from a user. Optionally, the keyboard 110 and the pointing device 112 may be connected to the visual display device 114. The computing device 102 may include other suitable conventional I/O peripherals. Moreover, the computing device 102 may be any computer system such as a workstation, desktop computer, server, laptop, handheld computer or other form of computing or telecommunications device that is capable of communication and that has sufficient processor power and memory capacity to perform the operations described herein.

Additionally, the computing device 102 may include a network interface 118 to interface to a Local Area Network (LAN), Wide Area Network (WAN) or the Internet through a variety of connections including, but not limited to, standard telephone lines, LAN or WAN links (e.g., T1, T3, 56 kb, X.25), broadband connections (e.g., integrated services digital network (ISDN), Frame Relay, asynchronous transfer mode (ATM), wireless connections (e.g., 802.11), high-speed interconnects (e.g., InfiniBand, gigabit Ethernet, Myrinet) or some combination of any or all of the above. The network interface 118 may include a built-in network adapter, network interface card, personal computer memory card international association (PCMCIA) network card, card bus network adapter, wireless network adapter, universal serial bus (USB) network adapter, modem or any other device suitable for interfacing the computing device 102 to any type of network capable of communication and performing the operations described herein.

The computing device 102 may further include a storage device 108, such as a hard-drive or CD-ROM, for storing an operating system (OS) and for storing application software programs, such as the computing application or environment 120. The computing environment 120 may run on any operating system such as any of the versions of the Microsoft® Windows operating systems, the different releases of the Unix and Linux operating systems, any version of the MacOS® for Macintosh computers, any embedded operating system, any real-time operating system, any open source operating system, any proprietary operating system, any operating systems for mobile computing devices, or any other operating system capable of running on the computing device and performing the operations described herein. Furthermore, the operating system and the computing environment 120 can be run from a bootable CD, such as, for example, KNOPPIX®, a bootable CD for GNU/Linux.

The computing environment 120 may use compiled languages and/or interpreted languages. In compiled languages, a high-level program statement may be compiled into a machine readable language that is directly executable by the machine. Compilers perform a translation of the high-level language program into machine language before the program is run. Compiled languages are usually faster than interpreted languages, because an interpreter or a virtual machine must typically process each high-level program statement each time it is executed, while a compiler need only translate each program statement once, after which the computer may execute the resulting code directly.

In interpreted languages, a high-level program statement is not translated into a form that is directly readable by the computer but is, instead, processed as data by an interpreter. A compilation phase may translate the high-level language into byte-codes that can be interpreted by the interpreter to carry out the instructions implied by the original program. Interpreted languages, however, are often easier to use and more powerful than compiled languages and so are often used to write smaller programs in which speed of program execution is not as important as speed and ease of writing the program. An interpreter may include a just-in-time (JIT) compiler which uses information taken from the running program to generate instructions that are directly readable by the computer. An interpreter that incorporates JIT compilation may recompile sequences of its instructions into different instructions, which may include machine language. In this way, an interpreted language can attain execution speed comparable to a compiled language.

Implementations of computing environment 120 may employ static variables and/or dynamic variables when performing elementwise operations. Static variable may refer to a type of variable that is fixed or bound at compile-time. For example, in one implementation, a static variable may be fixed at compile time in a manner whereby the variable cannot thereafter be changed.

Dynamic variable may refer to a variable type that is not fixed or bound until run-time. In one exemplary implementation, a dynamic variable may change during the course of program execution. A variable may include one or more properties that indicate the attributes of the variable. For example, dynamic typing refers to the property that a variable can adopt a type and change that type according to run-time demands.

The computing environment 120 may include an accelerator 122 that enables a computing application or computing environment 120 to compute one or more elementwise expressions in parallel. The accelerator 122 may use weighting factors to determine whether there are performance advantages to the parallel execution of expressions. If there are performance advantages to the parallel execution of expressions, the accelerator 122 may generate code for executing the expressions in parallel. The generated code may be executed in parallel on multiple execution units 104. The accelerator 120 may be part of a compiler in compiled languages or an interpreter in interpreted languages. The accelerator 120 may operate at compile-time, run-time, or both.

Figure 2:
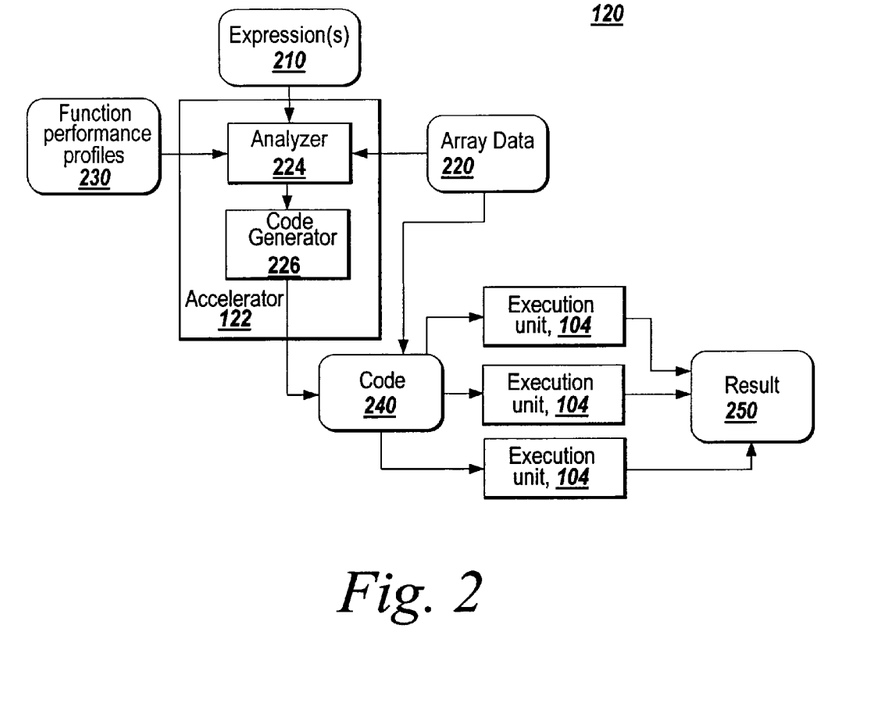
FIG. 2 is a block diagram of a computing environment for practicing an exemplary embodiment.

FIG. 2 is a block diagram of an exemplary embodiment for executing elementwise expressions in parallel in computing environment 120. Accelerator 122 may receive one or more expressions 210, data 220 of the arrays included in the expressions 210 and performance profiles 230 of the functions and/or operators included in the expressions 210, and may generate code 240 for the expressions 210 that can be executed in parallel by execution units 104. Expressions 210 may include one or more operators applied to arrays. Expressions 210 may also include one or more functions applied to arrays. In an exemplary embodiment, expressions 210 are computed using elementwise operations.

Accelerator 122 may include an analyzer 224 and a code generator 226. Analyzer 224 may analyze an expression to determine whether to execute the expression in parallel. The analyzer 224 may receive the array data 220 in the expression to determine whether to execute the expression in parallel. The array data 220 may include but is not limited to the type, shape, size, and contents of the arrays in the expressions.

The analyzer 224 may utilize one or more types of information to determine whether to execute an expression in parallel. For example, analyzer 224 may use expression 210, array data 220, and function performance profiles 230 to determine whether to execute an expression in parallel. The performance profiles may take into account the hardware on which the expressions are to run. The performance profiles may be pre-computed by measuring the performance of a set of sample operators and functions on specific hardware.

The performance profiles may be generated prior to execution by profiling a particular application and data set on specific hardware. An interpreter or compiler may provide a default set of performance profiles for functions and operators that it supports.

Any of the compilation phases in either compiled languages or interpreted languages may use the performance profiles generated before running an application to determine where parallel execution should be applied in the generated code. The generated code itself (bytecode or machine code) may refer to the performance profile in order to control its own parallel execution.

An interpreter may gather performance data during the execution of the program and use this to update performance profiles. It may then use these updated profiles to control where parallel execution is applied. An interpreter that uses JIT compilation technology may also recompile sections of code using these updated performance profiles to control where code that uses parallel execution is generated. An exemplary interpreter and JIT compilation technology is described in more detail in U.S. Pat. No. 6,973,644 (Title: PROGRAM INTERPRETER).

In element-by-by element operations, an expression may be split into multiple chunks and the chunks may be computed in series or parallel. For example, an expression including a vector of 1024 elements may be split into four chunks each chunk having a size of 256 elements of the vector (chunk_size). If there are two threads, the first and second chunks may be executed in series on the first thread, and the third and fourth chunks may be executed in series on the second thread. The first and second threads may be executed in parallel.

An exemplary embodiment may weight each operator and function in an expression based on the performance profiles. In an exemplary embodiment, the weight may refer to the number of chunks (number of elements/chunk_size) that are required in the expression to compute the expression in parallel. If the expression has more than one operator or function, the minimum weight of all operators and functions may be used. The operator or function of a minimum weight may be the most expensive function in the expression. For example, if the expression is sqrt(X)+Y, the chunk size is 1000 and weights are given as follows,

| Function | Weight (Number of Chunks) |
|---|---|
| Plus | 500 |
| Sqrt | 2 | the expression, sqrt(X)+Y, may be executed in parallel if the number of elements in X and Y is greater than 2*1000. In another example, if the expression is X+cos(Y), the chunk size is 1000 and weights are given as follows,

| Function | Weight (Number of Chunks) |
|---|---|
| Plus | 500 |
| Cos | 10 | the expression, X+cos(Y), may be executed in parallel if the number of elements in X and Y is greater than 10*1000.

If the analyzer 224 determines to execute the expression in parallel, the code generator 226 may generate code 240 that allows the expression to be executed in parallel on multiple execution units 104. An exemplary code generator may be the Real-time Workshop® product from The MathWorks, Inc. The code generator 226 may generate stand-alone C code for developing and testing algorithms. The resulting code can be used for many real-time and non-real-time applications, including rapid prototyping, and hardware-in-the-loop testing. The execution results from the multiple execution units 104 may be combined to produce a final execution result 250 of the expression.

An exemplary embodiment is described below with reference to the expression, Z=sqrt(X)+Y, where X and Y are vectors of length n. The code generator 226 may evaluate the expression, Z=sqrt(X)+Y, with chunk_size. The chunk_size is the number of elements of each array in the expression that are assigned to the same chunk for execution of the elementwise expression. Exemplary code evaluating the expression, Z=sqrt(X)+Y, with chunk-size is provided as follows where $T_1$ is a temporary vector of length, chunk_size.

```
for i = 1 to n / chunk_size
    start = (i−1)*chunk_size + 1;
    T_1[1, 2 , ..., chunk_size] = sqrt(X[start, start+1, ..., start+chunk_size−1]);
    Z[start, start+1, ..., start+chunk_size−1] = T_1[1, 2, ..., chunk_size] + Y[start, start+1, ..., start+chunk_size−1];
end
```

Figure 3:
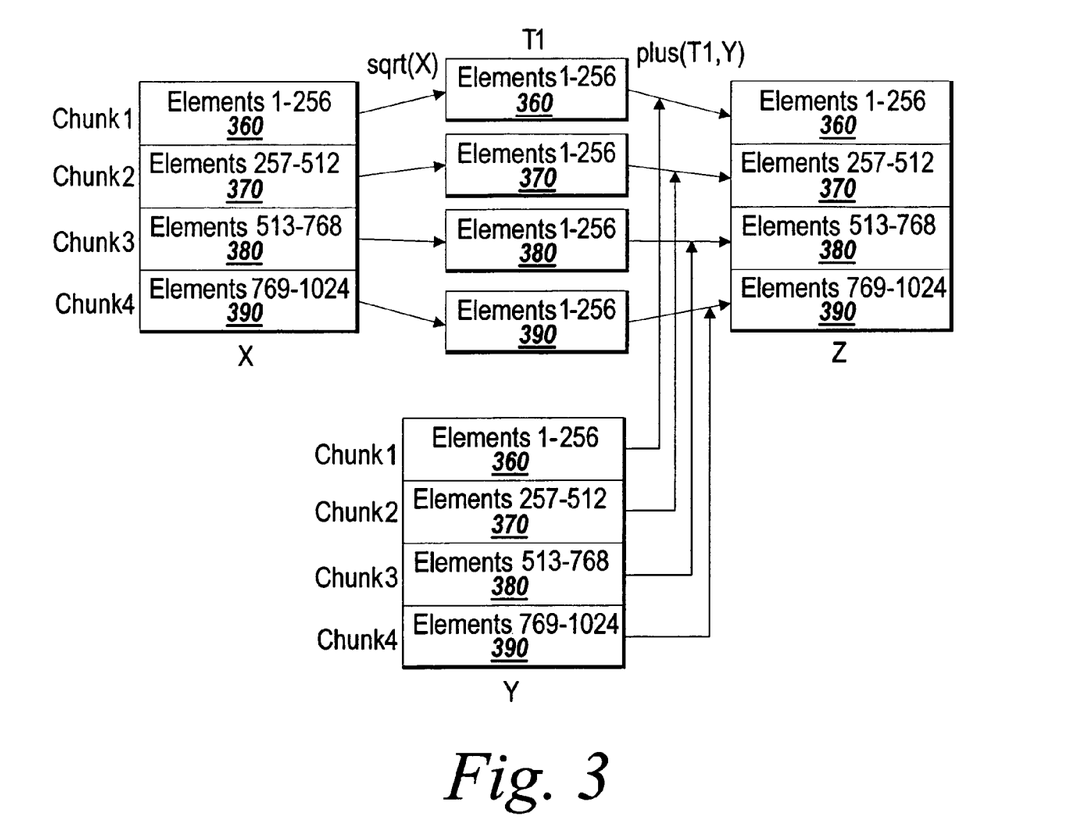
FIG. 3 shows multiple chunks of an expression provided in an exemplary embodiment.

FIG. 3 shows exemplary chunks of the expression, Z=sqrt(X)+Y, assuming n is 1024, and chunk_size is 256. In this example, the number of chunks is 4 (i.e., 1024/256). The first chunk 360 may be a portion of the expression with the square root function and the addition operator applied to element 1 through element 256 of vectors X and Y. The second chunk 370 is a portion of the expression with the square root function and the addition operator applied to element 257 through element 512 of vectors X and Y. The third chunk 380 is a portion of the expression with the square root function and the addition operator applied to element 513 through element 768 of vectors X and Y. The fourth chunk 390 is a portion of the expression with the square root function and the addition operator applied to element 769 through element 1024 of vectors X and Y.

The code generator 226 may generate code that can be executed in parallel on multiple execution units. To execute the expression in parallel, the computing environment 120 may determine the number of threads (num_threads) and the identification of each thread (thread_id). For example, values of thread_id may range from 0 to num_threads−1. The number of threads may be determined by a user or by the computing environment 120 based on the number of execution units on which the expression is executed in parallel.

Threads are portions of programs that can be executed in parallel with other portions of the programs. Multiple threads can be executed in parallel on multiple execution units. For example, different threads can run in parallel on different processors or cores. Multiple threads can also be executed in parallel on a single processor or core by time-slicing. A single processor or core may switch between different threads so fast as to compute the expression nearly simultaneously.

In an exemplary embodiment, each thread may execute the following code for executing the expression, Z=sqrt(X)+Y, in parallel where $T_j$ is a vector of length chunk_size, j is the thread ID, and each $T_j$ is local to the thread with ID j.

```
for i = 1 to n / chunk_size / num_threads
    start = (i−1)*chunk_size*thread_id + 1;
    T_j[1, 2 , ..., chunk_size] = sqrt(X[start, start+1, ..., start+chunk_size−1]);
    Z[start, start+1, ..., start+chunk_size−1] = T_j[1, 2, ..., chunk_size] + Y[start, start+1, ..., start+chunk_size−1];
end
```

Figure 4:
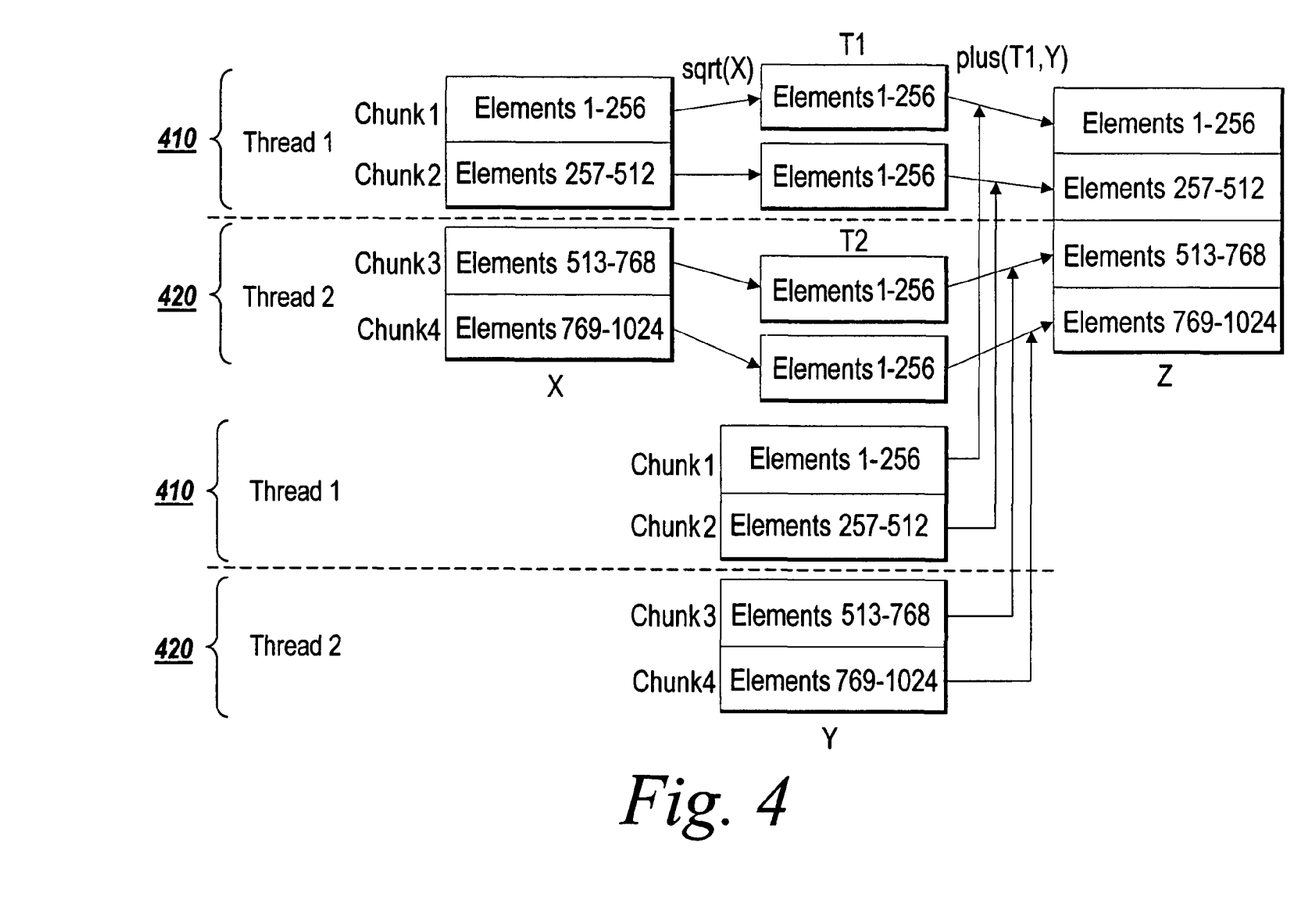
FIG. 4 shows multiple threads for executing an expression in parallel in an exemplary embodiment.

FIG. 4 shows exemplary threads that execute the chunks depicted in FIG. 3. An exemplary embodiment assumes that there are two threads 410 and 420. In an exemplary embodiment, the first thread 410 executes the first and second chunks 360 and 370 and the second thread 420 executes the third and fourth chunks 380 and 390 in parallel on multiple execution units. The execution results from the multiple execution units may be combined to produce the vector Z, which is a final computation result of the expression. In an exemplary embodiment, the multiple execution units 104 may reside on a network as depicted FIG. 5.

Figure 5:
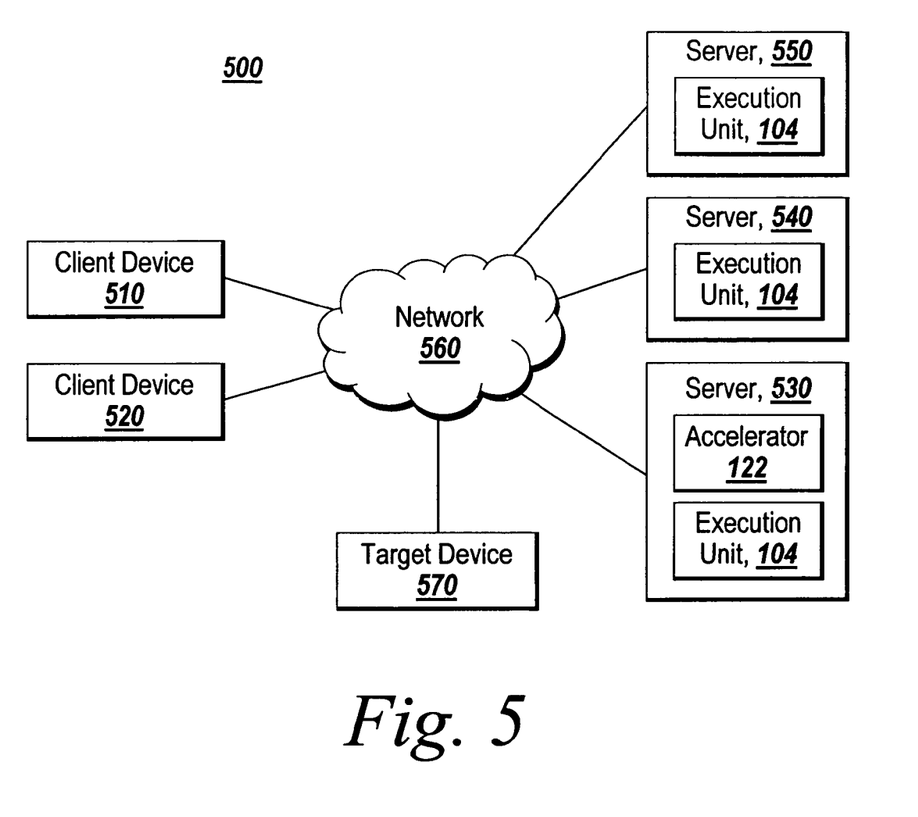
FIG. 5 is a block diagram of a network implementation that can be used for practicing an exemplary embodiment.

FIG. 5 depicts an exemplary network environment 500 suitable for practicing an exemplary embodiment. The environment 200 may include client devices 510 and 520 in communications with servers 530, 540 and 550 over the network 560. A target device 570 may be coupled to the network 560. The computing environment 120 has one or more software components that run on each of the clients 510 and 520 and servers 530, 540 and 550.

The client devices 510 and 520 may provide an interface functionality that enables a user to access the computing application or environment 120. With the interface functionality, the user may input one or more arithmetic expressions to be executed in the computing environment 120. The user may also specify a file containing one or more arithmetic expressions. The client devices 510 and 520 may communicate with the servers 530, 540 and 550 to execute the expressions by multiple execution units on the network 560.

The servers 530, 540 and 550 may be coupled to the network 560. The server 530, 540 and 550 may include one or more execution units 104. At least one of the servers 530, 540 and 550 (for example, server 530) may include an accelerator 122 for generating code for executing the elementwise expressions in parallel. The server 530 may execute a portion of the generated code locally and send other portions of the code to the servers 540 and 550 for execution. The server 530 may receive the execution results from the servers 540 and 550 and produce a final computation result of the expression by combining all of the execution results. The server 530 may send the final result to client devices 510 and 520 so that client devices 510 and 520 can display the final result to the user. The network implementation of concurrent computations is described in more detail in co-pending U.S. patent application Ser. No. 10/940,152 (Title: METHODS AND SYSTEM FOR EXECUTING A PROGRAM IN MULTIPLE EXECUTION ENVIRONMENTS) filed on Sep. 13, 2004, and U.S. patent application Ser. No. 10/896,784 (Title: METHODS AND SYSTEM FOR DISTRIBUTING TECHNICAL COMPUTING TASKS TO TECHNICAL COMPUTING WORKERS) filed Jul. 21, 2004. The content of the applications is incorporated herein by reference in its entirety.

In an exemplary embodiment, the code generated by the accelerator 122 may be deployed to the target device 570 for executing the expressions in the target device 570. The target device 570 may include multiple execution units 104 for executing the elementwise expressions in parallel in the target device 570. An exemplary target device is the xPC Target device, from The MathWorks, Inc. The xPC Target device is a solution for prototyping, testing, and deploying real-time systems using standard PC hardware. The xPC Target device is an environment that uses a target PC, separate from a host PC, for running real-time applications.

Figure 6:
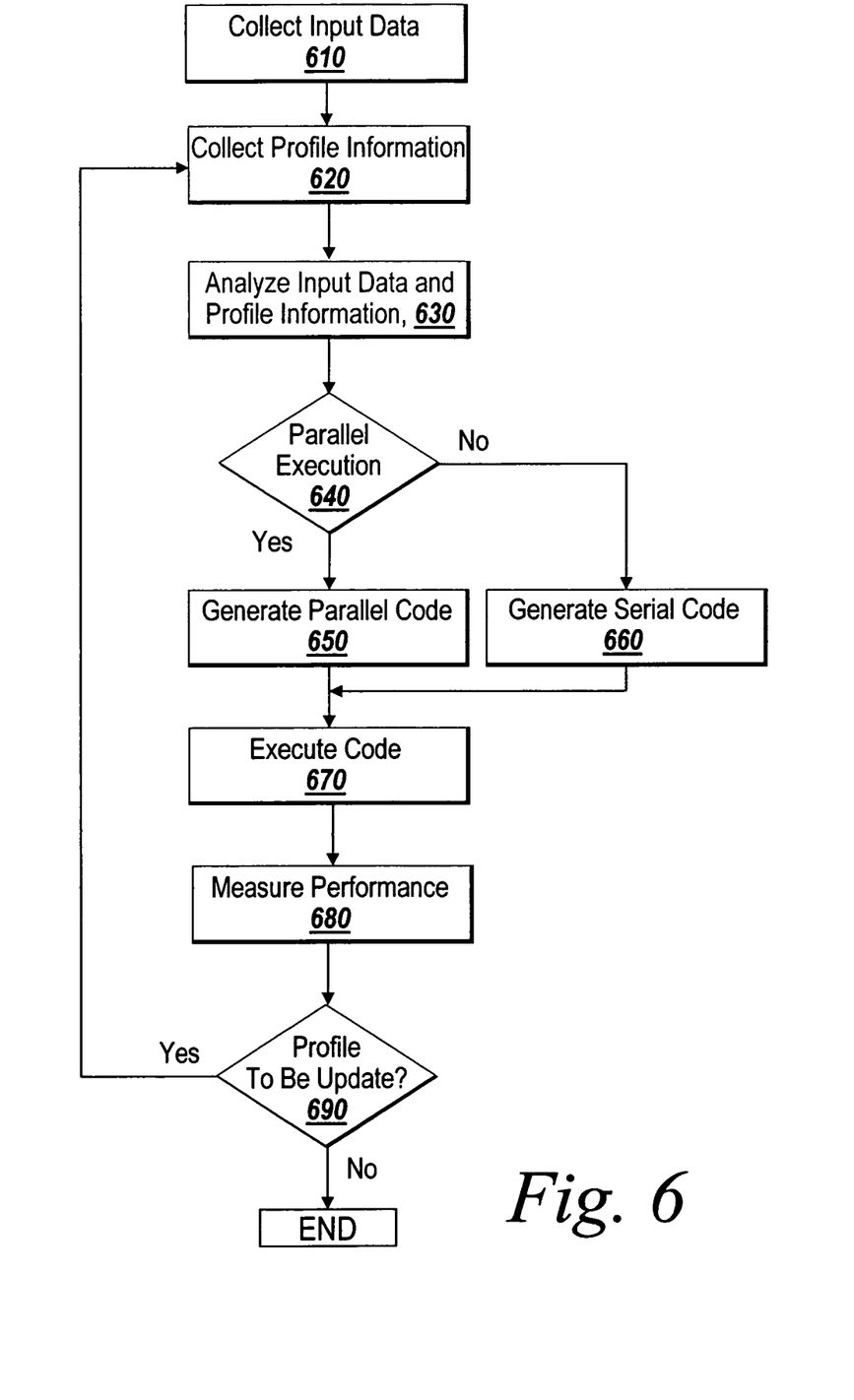
FIG. 6 is a flow chart showing an exemplary processing for executing an expression in parallel in an exemplary embodiment.

FIG. 6 is a flow chart illustrating an exemplary proceeding of a computing environment for executing elementwise expressions in parallel. The computing environment may receive input data that may be executed in parallel (step 610), as well as profile information that the computing environment will use to determine whether or not parallel execution is appropriate (step 620). The computing environment may provide user interfaces for a user to input data.

Figure 7:
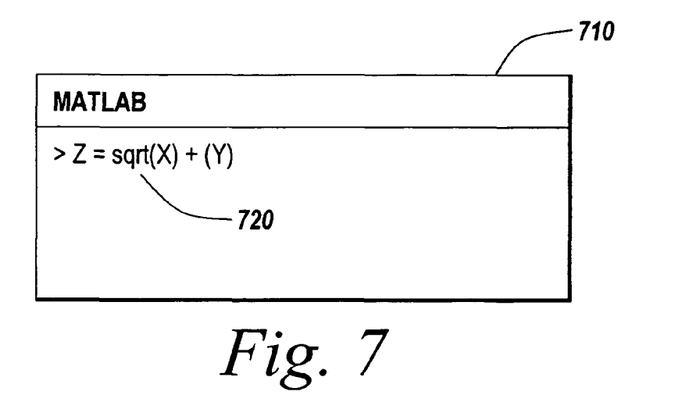
FIGS. 7-9 are user interfaces provided in exemplary embodiments.

FIG. 7 shows an exemplary user interface 710 in which a user can input expressions in a command line interface 720. In another exemplary embodiment, the expressions may be stored in a file, such as M-files, so that the computing environment may receive expressions from the file.

Figure 8:
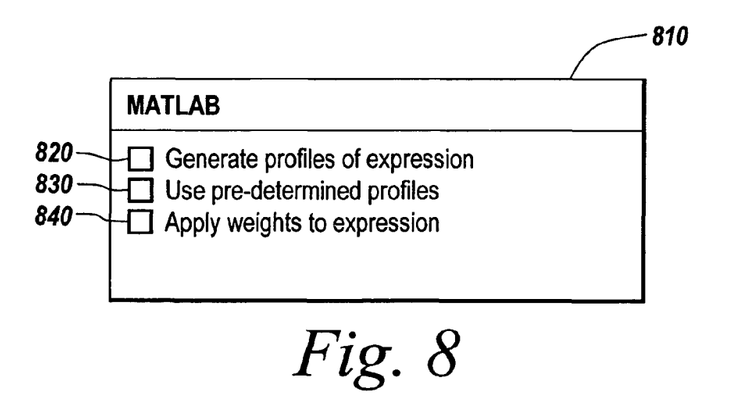

FIG. 8 shows an exemplary user interface in which a user can optimize the parallel execution of input expressions. The user interface 810 may enable a user to select checkboxes 820 and 830 to specify whether to generate profiles of the operators and functions or use pre-computed weights of operators and functions, respectively. The user interface 810 may also enable a user to select 840 whether to apply weights to the operators and functions of the expressions. In an exemplary embodiment, the user interfaces and the accelerator described above may be implemented in optimization tools for optimizing execution of input algorithms.

Figure 9:
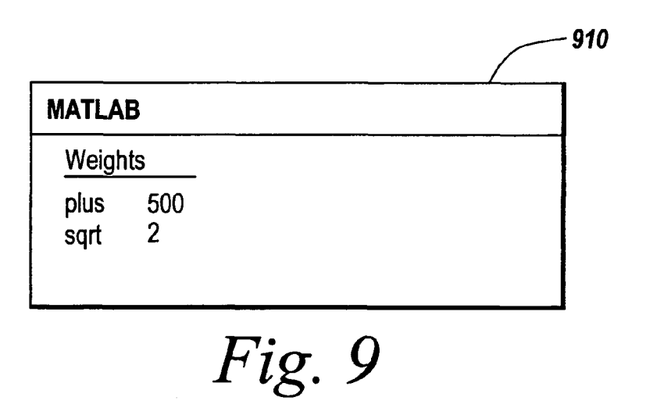

FIG. 9 shows an exemplary user interface in which weights of the operators and functions in an expression are displayed. For example, the user interface 910 may display the weights of the operators and functions in the expression, Z=sqrt(X)+Y.

The computing environment may analyze the profiles of the operators and functions in the expressions and the array data in the expressions (step 630) and determine whether to execute the elementwise expressions in parallel based on the analysis of the profiles of the operators and functions in the expressions and the array data in the expressions (step 640). If the computing environment determines to execute the expressions in parallel, the computing environment may generate code for executing the expressions in parallel using multiple execution units (step 650). If the computing environment determines not to execute the expressions in parallel, the computing environment will generate serial code for executing the chunks of expressions in series by a single execution unit (step 660). In another exemplary embodiment, the generation of serial code for executing the expressions may be performed prior to determining whether to execute the expressions in parallel. The execution unit or units may execute the serial or parallel code for computing the expressions (step 670). In an exemplary embodiment, the execution performance may be measured at run-time (step 680). In this case, the computing environment may decide to regenerate or modify the code based on the profile information for future executions (690).

Many alterations and modifications may be made by those having ordinary skill in the art without departing from the spirit and scope of the invention. Therefore, it must be expressly understood that the illustrated embodiments have been shown only for the purposes of example and should not be taken as limiting the invention, which is defined by the following claims. These claims are to be read as including what they set forth literally and also those equivalent elements which are insubstantially different, even though not identical in other respects to what is shown and described in the above illustrations.

What is claimed is:

1. A computer-implemented method comprising:
obtaining an expression including at least an array to which one of an elementwise operator or an elementwise function is applied;
starting execution of the expression in a computing environment;
weighting the elementwise operator or the elementwise function based on a performance profile,
the performance profile pre-computed by measuring a performance of a sample elementwise operator or function on specific hardware prior to the execution of the expression;
determining, during the execution of the expression, that a portion of the expression is to be executed in parallel,
the determining is based on the weighting and a number of elements in the array; and
continuing the execution of the expression in the computing environment by executing a subset of the elements of the array in parallel with one or more additional subsets of the elements of the array.

2. The method of claim 1, wherein the computing environment is a dynamically typed computing environment.

3. The method of claim 1, wherein the computing environment is an interpreted computing environment.

4. The method of claim 3, wherein the interpreted computing environment uses just-in-time compilation.

5. The method of claim 1, wherein the execution of the expression with the subsets of the elements of the array are is conducted in parallel by different threads.

6. The method of claim 1, further comprising:
execute portions of code in parallel, the code associated with the expression.

7. The method of claim 6, further comprising:
deploying the code to target hardware for execution.

8. A non-transitory computer-readable medium holding instructions that, when executed at least one computing device, cause the at least one computing device to:
obtain an expression including at least an array to which one of an elementwise operator or elementwise function is applied;
start execution of the expression in a computing environment;
weight the elementwise operator or the elementwise function based on a performance profile, the performance profile pre-computed by measuring a performance of a sample elementwise operator or function on specific hardware prior to the execution of the expression;

determine, during the execution of the expression, that a portion of the expression is to be executed in parallel, the determining is based on the weighting and a number of elements in the array; and continue the execution of the expression in the computing environment by executing a subset of the elements of the array in parallel with one or more additional subsets of the elements of the array.

9. The medium of claim 8, wherein the computing environment is a dynamically typed computing environment.

10. The medium of claim 8, wherein the computing environment is an interpreted computing environment.

11. The medium of claim 10, wherein the interpreted computing environment uses just-in-time compilation.

12. The medium of claim 8, wherein the execution of the expression with the subsets of the elements of the array is conducted in parallel by different threads.

13. The medium of claim 8, further storing one or more instructions that, when executed by the at least one computing device, cause the at least one computing device to:

execute portions of code in parallel, the code associated with the expression.

14. The medium of claim 13, further storing one or more instructions that, when executed by the at least one computing device, cause the at least one computing device to:

deploy the code to target hardware for execution.

15. A system comprising:

a processor configured to execute instructions for:

obtaining an expression including at least an array to which an elementwise operator or an elementwise function is applied, starting execution of the expression in a computing environment, weighting the elementwise operator or elementwise function based on a performance profile, the performance profile pre-computed by measuring a performance of a sample elementwise operator or function on specific hardware prior execution of the expression, determining, during the execution of the expression, that a portion of the expression is to be executed in parallel, the determining is based on the weighting and a number of elements in the array, and continuing the execution of the expression in the computing environment by executing a subset of the elements of the array in parallel with one or more additional subsets of the elements of the array.

16. The system of claim 15, wherein the computing environment is a dynamically typed computing environment.

17. The system of claim 15, wherein the computing environment is an interpreted computing environment.

18. The system of claim 17, wherein the computing environment comprises a just-in-time compiler.

19. The system of claim 15, wherein the execution of the expression with the subsets of the elements of the array is conducted in parallel by different threads.

20. The system of claim 19, wherein the code is deployed to target hardware for execution.

21. The system of claim 15, wherein the processor is further configured to execute instructions for:

executing portions of code in parallel, the code associated with the expression.

* * * * *

UNITED STATES PATENT AND TRADEMARK OFFICE
CERTIFICATE OF CORRECTION

PATENT NO. : 8,799,871 B2
APPLICATION NO. : 11/651119
DATED : August 5, 2014
INVENTOR(S) : Brett Baker It is certified that error appears in the above-identified patent and that said Letters Patent is hereby corrected as shown below:

On the title page 2, Column 2, line 2, item (56) under "Other Publications", delete "Hetergeneous" and insert --Heterogeneous-- in lieu thereof.

On the title page 2, Column 2, line 5, item (56) under "Other Publications", delete "Funtional" and insert --Functional-- in lieu thereof.

On the title page 2, Column 2, line 10, item (56) under "Other Publications", delete "Sillicon" and insert --Silicon-- in lieu thereof.

On the title page 2, Column 2, line 11, item (56) under "Other Publications", delete "Arothmetic" and insert --Arithmetic-- in lieu thereof.

On the title page 2, Column 2, line 16, item (56) under "Other Publications", delete "Coprocssors" and insert --Coprocessors-- in lieu thereof.

On the title page 2, Column 2, line 31, item (56) under "Other Publications", delete "Protable" and insert --Portable-- in lieu thereof.

In the Claims

Column 10, line 51, in Claim 5, delete "are".

Column 10, line 62, in Claim 8, delete "one of".

Column 12, line 7, in Claim 15, insert --to-- after "prior".

Signed and Sealed this
Eleventh Day of November, 2014

Michelle K. Lee
*Deputy Director of the United States Patent and Trademark Office*